United States Patent
Fujiyoshi

(10) Patent No.: US 7,570,789 B2
(45) Date of Patent: Aug. 4, 2009

(54) CHARGE DETECTING CIRCUIT AND FINGERPRINT SENSOR USING THE SAME

(75) Inventor: Tatsumi Fujiyoshi, Miyagi-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 625 days.

(21) Appl. No.: 11/099,829

(22) Filed: Apr. 5, 2005

(65) Prior Publication Data
US 2005/0226478 A1   Oct. 13, 2005

(30) Foreign Application Priority Data
Apr. 7, 2004   (JP)  ............................. 2004-113015

(51) Int. Cl.
*G06K 9/00* (2006.01)
(52) U.S. Cl. .................................... 382/124
(58) Field of Classification Search ............... None
See application file for complete search history.

(56) References Cited

U.S. PATENT DOCUMENTS

| | | | |
|---|---|---|---|
| 4,255,057 A * | 3/1981 | Williams | 356/435 |
| 5,633,594 A | 5/1997 | Okada | |
| 5,778,089 A * | 7/1998 | Borza | 382/124 |
| 6,525,547 B2 * | 2/2003 | Hayes | 324/662 |
| 6,681,033 B1 * | 1/2004 | Yano et al. | 382/124 |
| 2001/0012384 A1 * | 8/2001 | Kalnitsky et al. | 382/124 |

* cited by examiner

*Primary Examiner*—Matthew C Bella
*Assistant Examiner*—Alex Liew
(74) *Attorney, Agent, or Firm*—Beyer Law Group LLP

(57) ABSTRACT

A capacitance detecting circuit detects the variations of capacitances at intersections of a plurality of column lines and a plurality of row lines opposite to the column lines and then converts the variations of capacitances into electrical signals. The capacitance detecting circuit includes a column line driving means that drives the column lines, a comparator that is connected to the row lines to convert charges stored in capacitors formed at the intersections of the driven column lines and the row lines into a measured voltage, and that compares the measured voltage with a predetermined set value to output charging or discharging signals, a constant current source that performs charging or discharging on the charges in response to the charging or discharging signals, and a capacitor that stores charges by means of the charging or discharging current. In the capacitance detecting circuit, a voltage between both ends of the capacitor is output as the electrical signal.

7 Claims, 9 Drawing Sheets

CHARGE DETECTING CIRCUIT AND FINGERPRINT SENSOR USING THE SAME

BACKGROUND OF THE INVENTION

1. Field of the Invention

The present invention relates to a capacitance detecting circuit used for a capacitor sensor to detect capacitance with the amount of charges, and to a fingerprint sensor using the same.

2. Description of the Related Art

Personal authentication technologies have attracted considerable attention in recent years to ensure various securities, and a technology of authenticating fingerprints using a fingerprint sensor among them is gradually put into practice in terms of the convenience of personal authentication of a cellular phone and the like.

As one example of the fingerprint sensor, an area-type fingerprint sensor is shown in FIG. 12, in which column lines and row lines (FIG. 12A) are formed on two films at a predetermined gap therebetween, and in which, after a necessary insulating film is formed on the upper surface of the film, the films are bonded to each other with an air layer (gap) or elastic insulating material interposed therebetween (FIG. 12B).

This area-type fingerprint sensor functions as a pressure sensitive sensor in which the shape of the film is changed corresponding to the shape of the fingerprint when a finger is in contact with the sensor, so that the gap between the column lines and the row lines is changed due to the unevenness of the fingerprint, thereby detecting the minute variation of capacitance as electrical signals based on the change of the gap.

As shown in the area-type sensor of FIG. 13, which is an equivalent circuit of FIG. 12, it is necessary to detect the minute change in capacitance in a matrix shape even less than several femtofarads (fF) on a point basis of each of the intersections where a plurality of column lines and a plurality of row lines intersect each other.

Therefore, the capacitance detecting circuit used for the area-type sensor must have high measurement sensitivity since the variation of capacitances at the intersections is very small.

In order to detect the variation of electrostatic capacitance, a well-known technology applicable to such high-sensitivity capacitance detection uses generally a capacitance detecting circuit having the structure of a charge amplifier using a feedback capacitor (Cf) and an operational amplifier, as shown in FIG. 14 (see Japanese Unexamined Patent Application Publication No. 8-145717 (Corresponding U.S. Pat. No. 5,633,594)).

However, according to the capacitance detecting circuit of the related art, the amount of charges of the capacitor to be detected is converted into a voltage level, based on the relationship between a predetermined capacitance and the voltage, using the configuration of the charge amplifier having the operational amplifier, as shown in FIG. 14, in order to detect the variation of capacitance.

In the charge amplifier, feedback control is carried out so as not to cause the variation of the input voltage. Therefore, there is a merit in that the charge amplifier is not affected by parasitic capacitance.

However, in the case of the area-type fingerprint sensor, the capacitance detecting circuit may require several channels.

In this case, in order to take the configuration of the charge amplifier shown in FIG. 14, for example, the operational amplifiers and feedback capacitors must be integrated in the several hundred units to correspond to the number of sensors.

In addition, an output voltage Vout is expressed as follows:

$$V_{out} = (C_{sen}/C_f) \times V_{in},$$

where Csen is capacitance to be detected (the amount of the variation of capacitance in a capacitor formed at each intersection of the sensor), Cf is the capacitance of the feedback capacitor, and Vin is a driving voltage for driving the column lines (which is output from the column line selecting circuit of FIG. 13).

Accordingly, by means of a ratio of Csen to Cf, the gain of an output voltage to an input voltage is set.

As described above, in order to configure the charge amplifier in the capacitance detecting circuit, each of the operational amplifier and the feedback capacitor must be integrated into an integrated circuit so as to correspond to the number of detection outputs of the sensor.

However, when the variation in capacitance of the sensor is detected to drive the column lines, the output voltage exceeds the power supply voltage of the operational amplifier to be saturated when Cf is small in the case of the variation of capacitance Csen of the capacitor at the intersection.

However, when Cf increases to correspond to the capacitance Csen of the intersection, an area where the feedback capacitor is formed increases, and a circuit area for the charge amplifier increases in response to the value of Cf, which causes a chip including the capacitance detecting circuit to be large-scaled, resulting in an increase in manufacturing costs.

Further, when a general-purpose capacitance detecting circuit is employed, gain adjustment is required in response to the area-type fingerprint sensor for the target of use, and the feedback capacitor having several capacitance values is prepared so as to perform adjustment on the gain, which are combined with each other to correspond to the respective targets.

As a result, an area for the feedback capacitor also increases due to this combination, which in turn causes the chip area to be increased, resulting in an increase in manufacturing costs.

SUMMARY OF THE INVENTION

The invention is designed to solve these problems, and an advantage of the invention is that it provides a capacitance detecting circuit capable of reducing the area of a chip in an integrated circuit, that is, the area of a portion where a capacitor (feedback capacitor) is formed, of reducing manufacturing costs, and of easily adjusting the gain of a detection voltage.

According to an aspect of the invention, there is provided a capacitance detecting circuit that detects the variations of capacitances at intersections of a plurality of column lines and a plurality of row lines opposite to the column lines and that converts the variations of capacitances into electrical signals. The capacitance detecting circuit includes a column line driving means that drives the column lines; a comparator that is connected to the row lines to convert charges stored in capacitors formed at the intersections of the driven column lines and the row lines into a measured voltage, and that compares the measured voltage with a predetermined set value to output charging or discharging signals; a constant current source that performs charging or discharging on the charges in response to the charging or discharging signals; and a capacitor that stores charges by means of the charging or discharging current. In the capacitance detecting circuit, a voltage between both ends of the capacitor is output as the electrical signal.

In addition, in the capacitance detecting circuit of the invention, the comparator outputs, as the charging or discharging signal, a charging signal indicating the charging when the measured voltage is positive, and outputs a discharging signal indicating the discharging when the measured voltage is negative. The constant current source includes a constant current source for charging and a constant current source for discharging, and performs a charging operation on the capacitor when the charging signal is input and performs a discharging operation on the capacitor when the discharging signal is input.

Therefore, the capacitance detecting circuit of the invention detects whether the voltage value output from the area-type fingerprint sensor resulted from the column driving signal is higher than the threshold value of the comparator. As a result, when the voltage value is higher than the threshold value, the capacitance detecting circuit carries out charging by means of the constant current source to store charges. On the other hand, when the voltage value is smaller than the threshold value, it carries out discharging by means of the constant current source to emit charges. Therefore, the voltage of the capacitor may be output as a voltage signal after the charging or discharging thereof is carried out, which allows the gain of the output voltage to be readily changed by adjusting the current value of the constant current source, and a large feedback capacitor is not required for adjusting the gain of the output voltage, which otherwise has been required in the related art. In addition, the area for forming the capacitance detecting circuit can be reduced, resulting in a reduction in manufacturing costs.

Further, in the capacitance detecting circuit of the invention, it is preferable that the comparator be composed of an inverter, which is a digital circuit.

By means of this configuration, the number of transistors of the capacitance detecting circuit of the invention can be significantly reduced as compared to the related art, which allows the area for forming the capacitance detecting circuit to be decreased, resulting in a reduction in manufacturing costs.

In the capacitance detecting circuit of the invention, it is preferable that the constant current source be composed of a current mirror circuit using transistors, that an output transistor of the current mirror circuit be divided into a plurality of transistors whose on or off states are controlled switches, and that a current ratio be set to a plurality of values.

By means of this configuration, when the gain of the output voltage is adjusted, transistors each having a small formation area are selected to allow the gain to be readily adjusted in accordance with the capacitance detecting circuit of the invention, whereas a plurality of feedback capacitors is prepared to perform switching in response to the gain in accordance with the related art. Therefore, the area for forming the capacitance detecting circuit does not significantly increase, and the gain for the circuit can be adjusted in a simple and easy manner.

Further, according to another aspect of the invention, there is provided a fingerprint sensor that detects the unevenness of a fingerprint by the variations of capacitances at intersections of a plurality of column lines and a plurality of row lines opposite to the column lines, and the variation of capacitances is detected by the above-mentioned capacitance detecting circuit.

By means of this configuration, the fingerprint sensor of the invention uses a capacitance detecting circuit having a low manufacturing cost. Therefore, it is possible to manufacture a fingerprint sensor at a low cost, compared to the related art.

DESCRIPTION OF THE PREFERRED EMBODIMENTS

Figure 1:
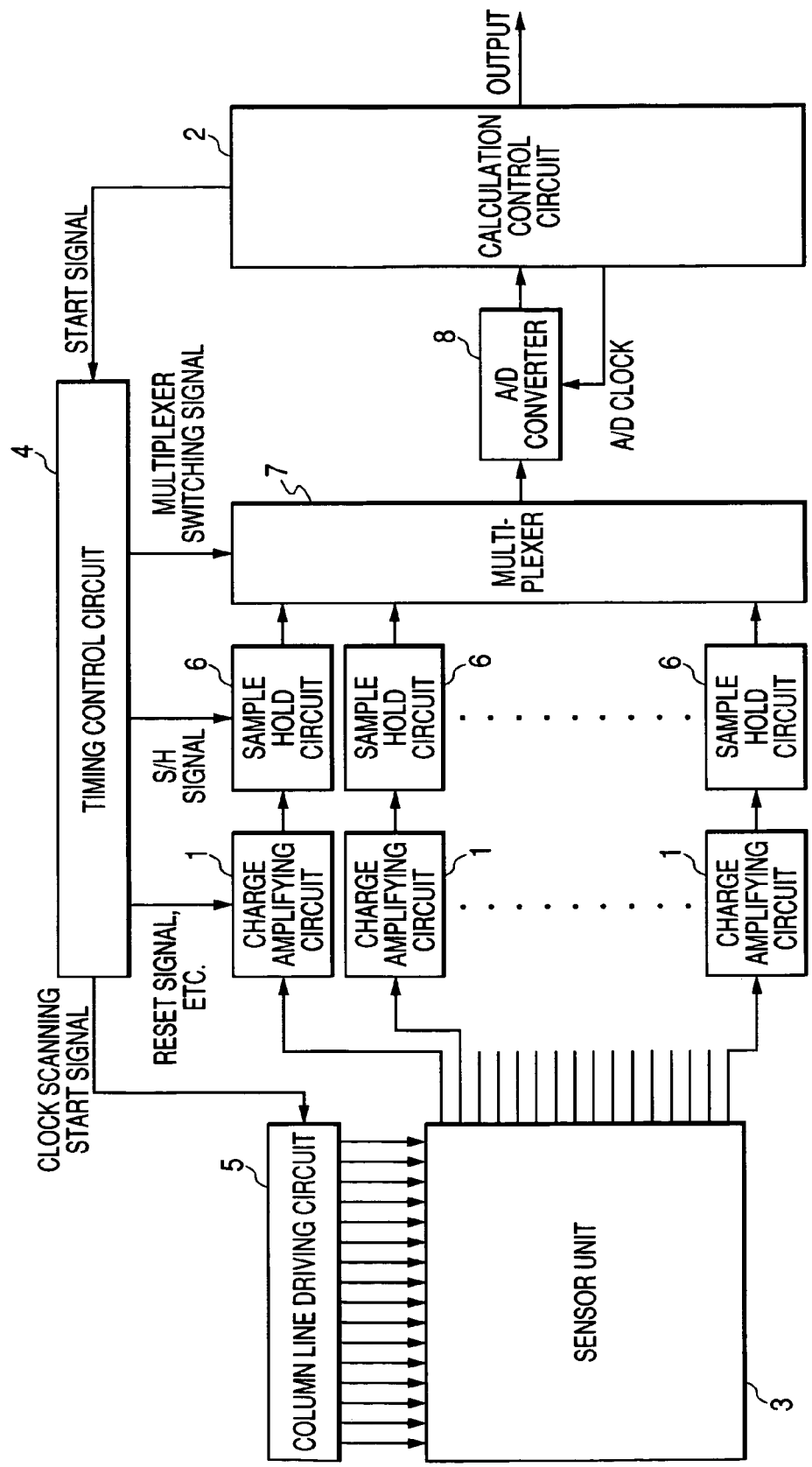
FIG. 1 is a block diagram illustrating the configuration of a fingerprint sensor according to an embodiment of the invention.

Hereinafter, a capacitance detecting circuit according to an embodiment of the invention will be described with reference to the drawings. FIG. 1 is a block diagram illustrating an example of the configuration of a fingerprint sensor using the capacitance detecting circuit according to the present embodiment.

Figure 12A:
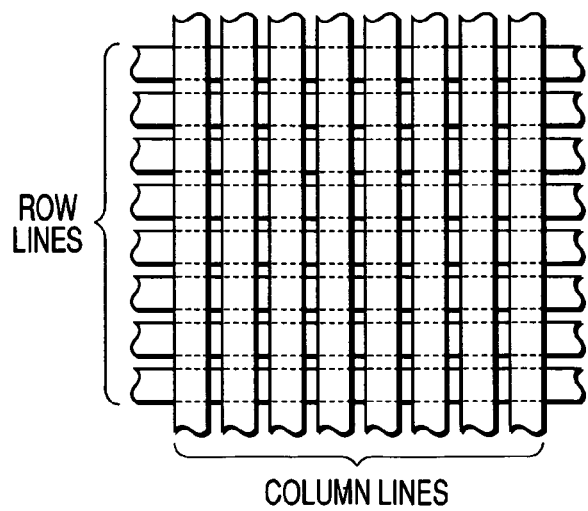
FIG. 12 is a conceptional view explaining the structure of an area-type sensor.
Figure 12B:
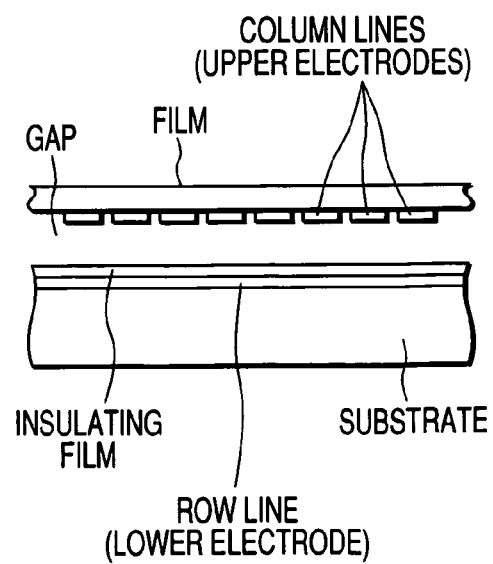

In FIG. 1, the present embodiment is different from the related art in that a capacitance detecting circuit 1 according to the invention is used for a charge amplifier. In this case, a sensor unit 3 has the same configuration as that described in FIGS. 12 and 13.

Referring to the block diagram of FIG. 1, a calculation control circuit 2 outputs a fingerprint detection start signal to a timing control circuit 4 when it is ready to detect the measurement signal from the sensor unit 3.

The timing control circuit 4, in response to the input of the start signal, outputs a scanning start signal and a clock for taking the timing for driving column lines to a column line driving circuit 5 at a predetermined timing.

Figure 2:
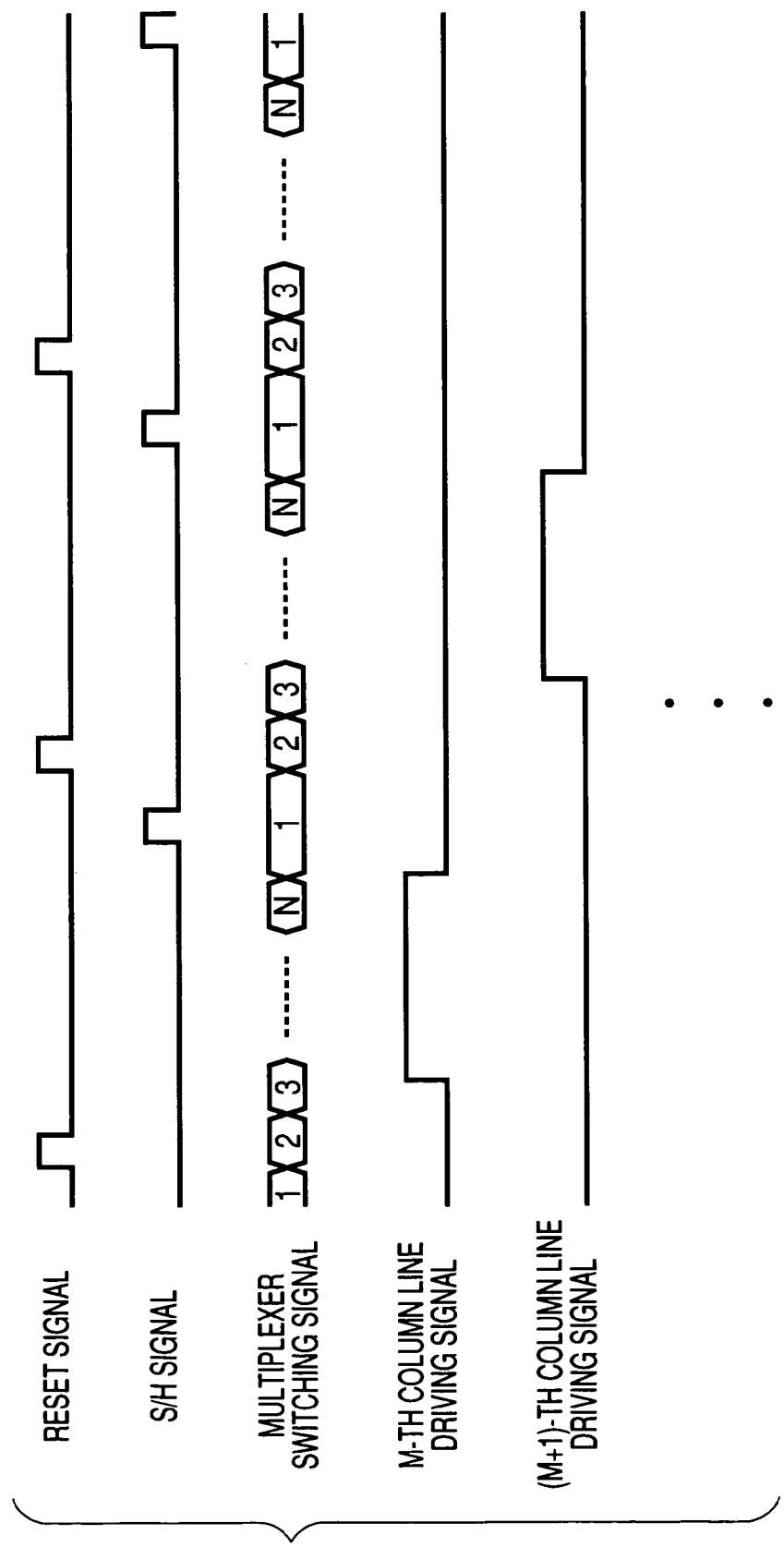
FIG. 2 is a timing chart illustrating the operation of the fingerprint sensor of FIG. 1.

A charge amplifying circuit (capacitance detecting circuit) 1 is initialized by a reset signal, as shown in the timing chart of FIG. 2, and detects the change in capacitance of capacitors formed at the intersections of row lines and column lines driven by the column line driving circuit 5 as the change in voltage, by detecting charges. Then, the charge amplifying circuit 1 outputs the detected voltage signal to a sample hold circuit 6 in the next stage disposed corresponding to each row line.

The sample hold circuit 6 retains the voltage signal in response to sample hold (S/H) signals output from the timing control circuit 4 at a predetermined timing.

A multiplexer 7 sequentially selects the voltage signals corresponding to the row lines which are retained in the sample hold circuit 6 in a time-division manner by means of multiplexer switching signals, and outputs them to an analog-to-digital (A/D) converter 8.

The A/D converter 8 samples the voltage signal sequentially output from the multiplexer 7 at the timing of an A/D clock in synchronism with the multiplexer switching signal, and converts it into a detection signal, which is a digital signal corresponding to each voltage signal to output the detection signal to the calculation control circuit 2.

In addition, the calculation control circuit 2 converts the detection signal, which is the digital signal, into data suitable for fingerprint authentication, and outputs it to an external circuit.

Figure 13:
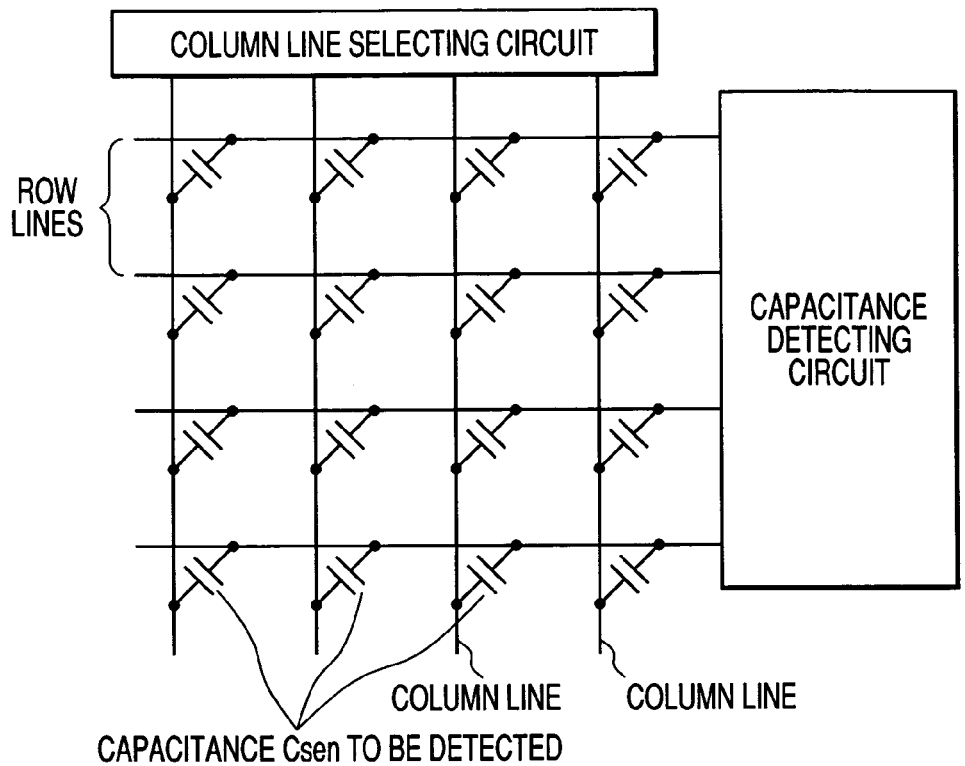
FIG. 13 is a conceptional view illustrating an equivalent circuit of the area-type sensor of FIG. 12.
Figure 14:
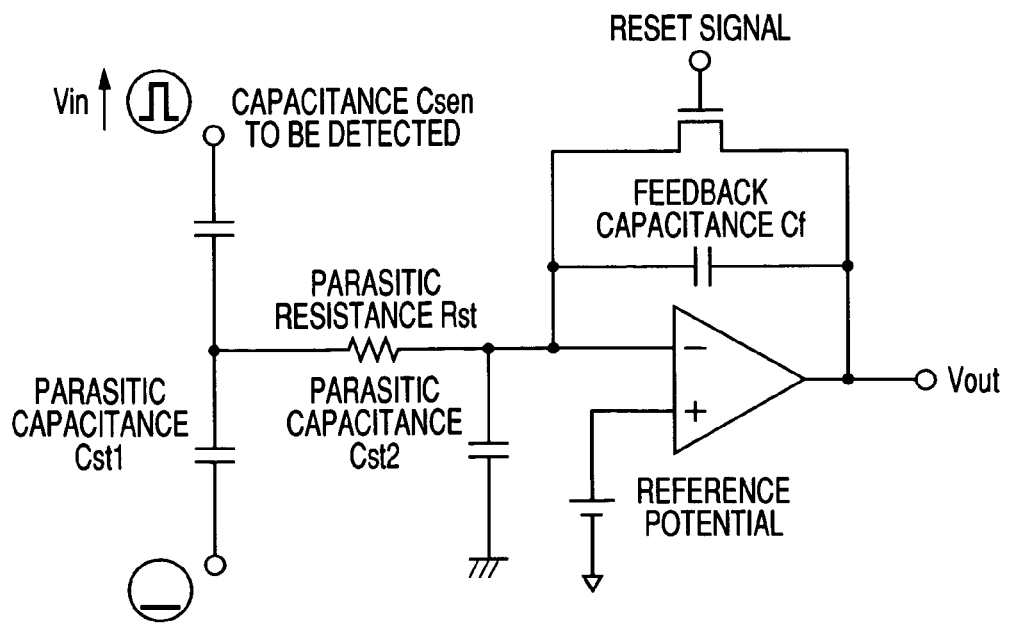
FIG. 14 is a block diagram illustrating the configuration of a charge amplifying circuit according to the related art of FIG. 12.

That is, referring to the equivalent circuit of FIG. 13, an independent capacitor (capacitor) having very small capacitance is formed at an intersection of the column line and the row line, and the distance between electrodes of this capacitor is changed according to the unevenness of the fingerprint, which allows the fingerprint shape to be read as a change in capacitance.

The detection of the change in capacitance resulted from the fingerprint shape is carried out such that, when the capacitance of the capacitor at the intersection of the row line and the column line sequentially driven by the column line driving circuit 5 in a pulse manner is changed, the charge amplifying circuit 1 reads the change of the capacitance as the change of the amount of charges, sequentially corresponding to each column line in a time-division manner, as described above.

Figure 3:
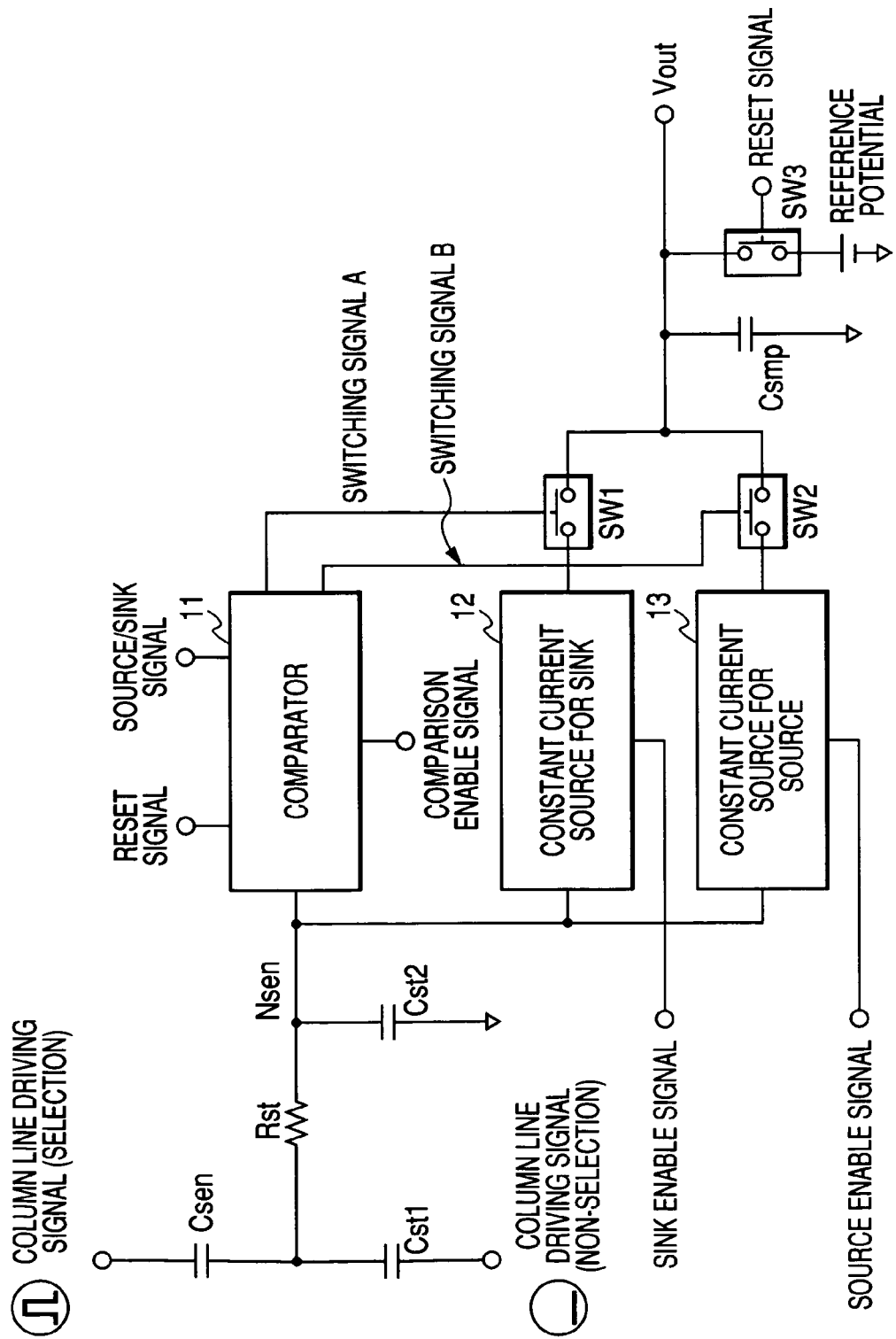
FIG. 3 is a block diagram illustrating the configuration of a charge amplifying circuit 1 according to an embodiment of the invention of FIG. 1.

Next, the charge amplifying circuit 1 of the present embodiment will be described in detail with reference to FIG. 3. FIG. 3 is a block diagram illustrating the configuration of the charge amplifying circuit 1. The sensor unit 3 is shown as an equivalent circuit.

A comparator 11 detects the change in the amount of charges corresponding to the capacitance Csen of the capacitor at the intersection of the row line and the selected column line driven by the column line driving signal, and outputs it as a voltage signal. In this case, 'Cst1' is a total capacitance of the capacitors formed at the intersections of the row line and the column lines that are not driven. In addition, 'Rst' is the resistance of the row line, and 'Cst2' is a parasitic capacitance of the row line.

In addition, the comparator 11 performs detection on whether the voltage of a node Nsen corresponding to the change in the voltage of charges exceeds a predetermined threshold voltage, and outputs a switching signal A to make a switch SW1 turned on (a switch 2 is in an off state) when the voltage of the node Nsen is greater than the threshold value. On the other hand, the comparator 11 outputs a switching signal B to make the switch SW2 turned on (the switch 1 is in an off state) when the voltage of the node Nsen is smaller than the threshold value.

In this case, the timing control circuit 4 outputs a sink enable signal to activate a constant current source 12 for a sink when the positive column line driving signal is output from the column line driving circuit 5. On the other hand, the timing control circuit 4 outputs a source enable signal to activate a constant current source 13 for a source when the negative column line driving signal is output therefrom.

Similarly, the timing control circuit 4 outputs a source/sink signal indicating the sink when the positive column line driving signal is output from the column line driving signal 5. On the other side, the timing control circuit 4 outputs a source/sink signal indicating the source when the negative column line driving signal is output therefrom.

The constant current source 12 for a sink and the constant current source 13 for a source output a current in proportion to the current corresponding to the variation of the amount of charges (that is, they amplify the current and then output it).

A storage capacitor Csmp stores and charges or discharges predetermined charges by means of the current flowing through the constant current source 12 for a sink and the constant current source 13 for a source via the switch SW1 and the switch SW2, respectively.

Figure 4:
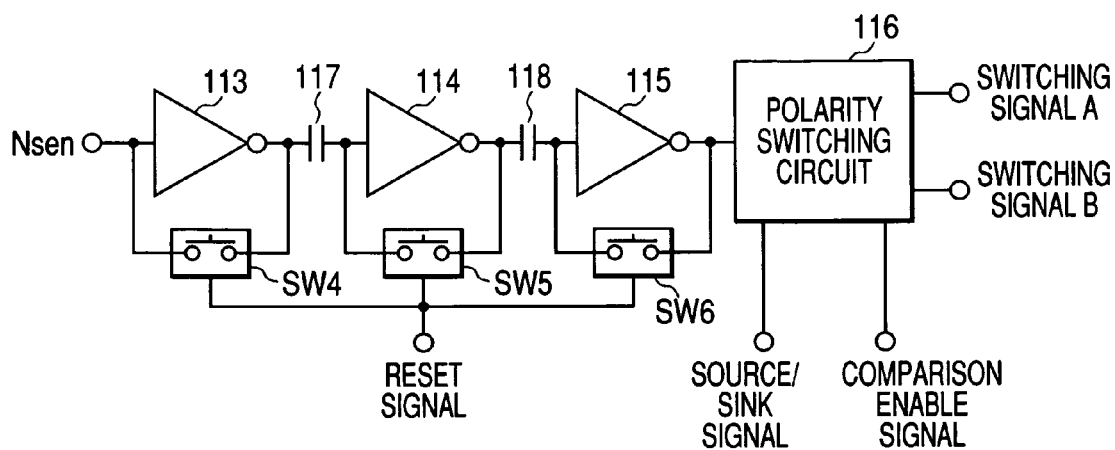
FIG. 4 is a block diagram illustrating the configuration of a comparator 11 of FIG. 3.

Next, the comparator 11 may have a configuration using a differential amplifying circuit. However, in the present embodiment, a switching comparator having a three-stage configuration of NOT circuits 113, 114, and 115 (inverters), which are logical inverters, is employed, as shown in FIG. 4.

In this case, a capacitor 117 for blocking a direct current is disposed between an input terminal of the NOT circuit 114 and an output terminal of the NOT circuit 113. Similarly, a capacitor 118 for blocking a direct current is disposed between an input terminal of the NOT circuit 115 and an output terminal of the NOT circuit 114.

When a reset signal is input to the comparator 11, switches SW4, SW5, and SW6 are turned on, and input and output terminals of the respective NOT circuits 113, 114, and 115 become short-circuits, which causes the voltage value of the node Nsen to be set to a logical threshold voltage value of the inverter.

By means of this configuration, the comparator 11, in response to the voltage value of the node Nsen resulted from the input column line driving signal, outputs the switching signal A when this voltage value exceeds the threshold value, and outputs the switching signal B when it is smaller than the threshold value.

In this case, when a comparison enable signal is input from the timing switching circuit 4, a polarity switching circuit 116 of the comparator 11 outputs only the switching signal A as a result of comparison with the threshold value at the time when the source/sink signal indicates the sink. On the other hand, the polarity switching circuit 116 outputs only the switching signal B as a result of comparison with the threshold value at the time when the source/sink signal indicates the source.

Figure 5:
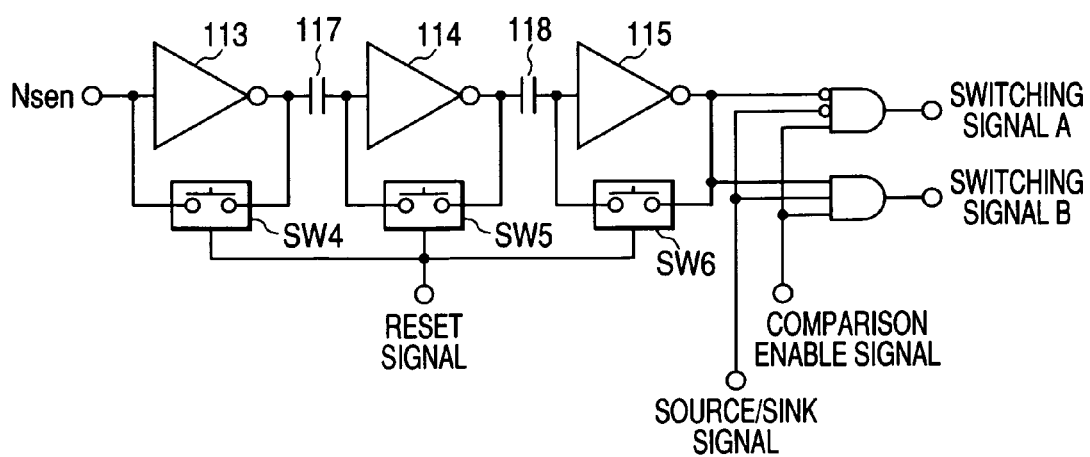
FIG. 5 is a block diagram illustrating the configuration of the comparator 11 of FIG. 4.
Figure 6:
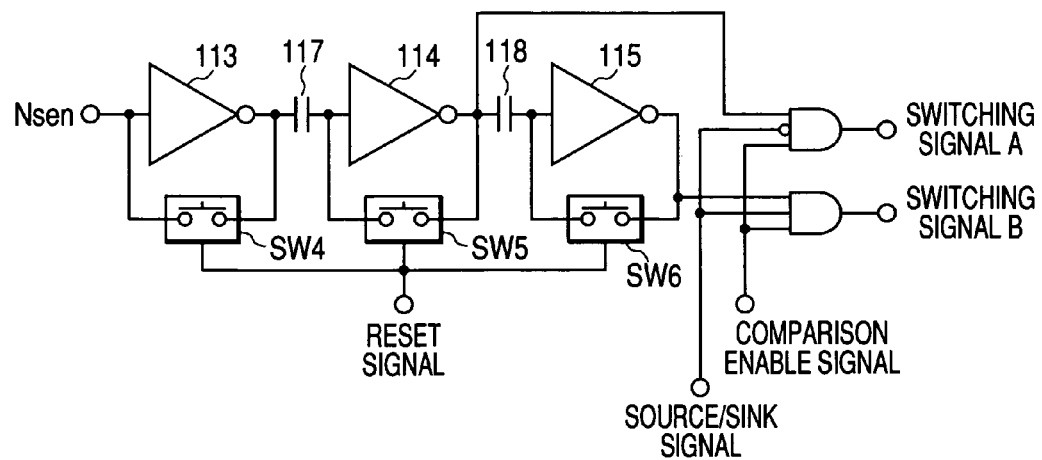
FIG. 6 is a block diagram illustrating the configuration of the comparator 11 of FIG. 4.
Figure 7:
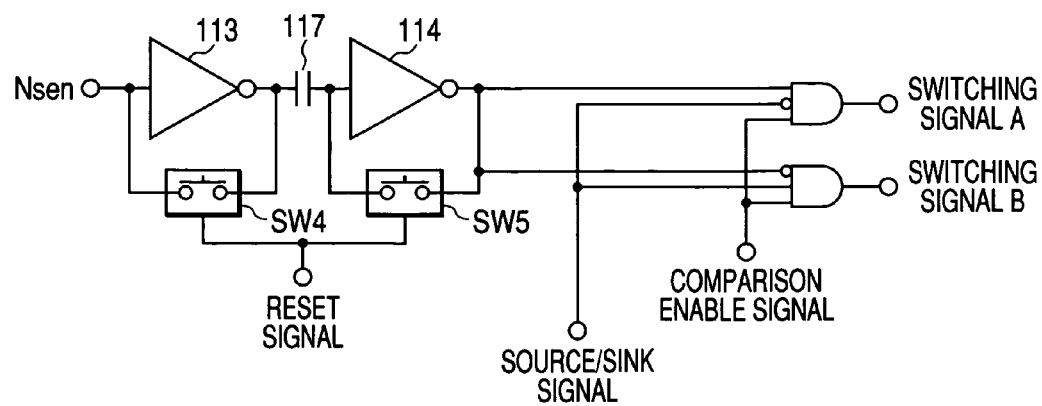
FIG. 7 is a block diagram illustrating the configuration of the comparator 11 of FIG. 4.

In this embodiment, the comparator 11 shown in FIG. 4 may have circuit configurations as shown in FIGS. 5, 6, and 7.

Referring to FIGS. 5 and 6, the polarity switching circuit 116 is composed of AND circuits, and FIG. 7 shows the more compact polarity switching circuit 116 having a two-stage structure of NOT circuits 113 and 114.

Other configurations except those of FIGS. 5 to 7 may be employed for the comparator 11 of the invention when they can implement the above-described function of the comparator 11.

That is, the condition for outputting the switching signal A is available only when the comparison enable signal is input, the source/sink signal indicates the sink state (for example, an 'L' level in this case), and the electric potential of the node Nsen is higher than the threshold value.

Meanwhile, the condition for outputting the switching signal B is available only when the comparison enable signal is input, the source/sink signal indicates the source state (for example, an 'H' level in this case), and the electric potential of the node Nsen is higher than the threshold value.

Figure 8:
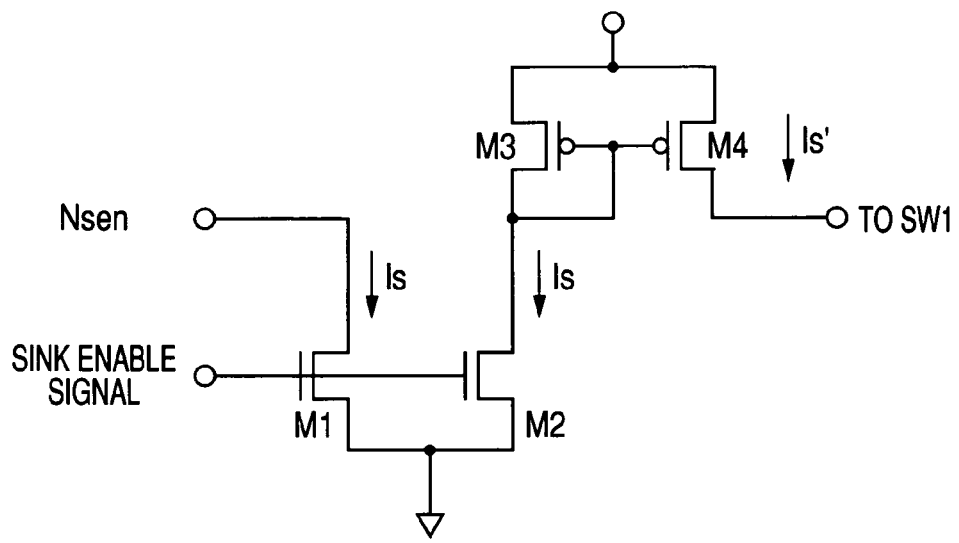
FIG. 8 is a block diagram illustrating the configuration of a constant current source 12 for a sink of FIG. 3.

In addition, FIG. 8 shows the configuration of the constant current source 12 for a sink. Transistors M1, M2, M3, and M4 are metal oxide semiconductor (MOS) transistors having a constant current operation, wherein the transistors M1 and M2 are n-channel types, whereas the transistors M3 and M4 are p-channel types.

In this case, all the transistors M1 and M2 and the transistors M3 and M4 are composed of current mirror circuits, and the sink enable signal can flow through gates of the transistors M1 and M2 so as to directly set a sink current Is with the voltage value thereof.

By means of this configuration, a current Is', for example, corresponding to the ratio of channel widths between the transistors M3 and M4 can be output with respect to the current Is corresponding to the voltage value of the node Nsen.

That is, when the size (W/L) of the transistor M1 is made to be equal to that of the transistor M2, the current Is also flows through the transistor M2, and the ratio of the output current Is' to the current Is may be freely set by setting the size of the transistor M3 to be different from that of the transistor M4.

Therefore, the magnitude of the current Is may be set as an optimal value by properly setting the voltage value of the sink enable signal and the size of the transistor M1.

Figure 9:
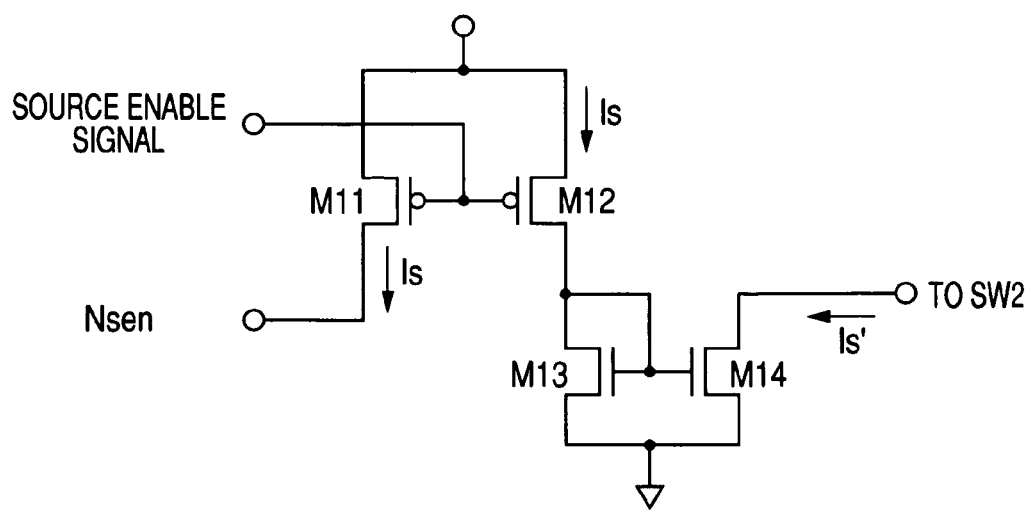
FIG. 9 is a block diagram illustrating the configuration of a constant current source 13 for a source of FIG. 3.

Next, FIG. 9 shows the configuration of the constant current source 13 for a source. Transistors M11, M12, M13, and M14 are MOS transistors having a constant current operation. Here, the transistors M11 and M12 are p-channel types, and the transistors M13 and M14 are n-channel types.

In this case, all the transistors M11 and M12 and the transistors M13 and M14 are composed of current mirror circuits, and the source enable signal flows through gates of the transistors M11 and M12 so as to directly set the source current Is with the voltage value thereof.

By means of this configuration, the current Is', for example, corresponding to the ratio of channel widths between the transistors M13 and M14 can be output with respect to the current Is corresponding to the voltage value of the node Nsen.

That is, when the size (W/L) of the transistor M11 is made to be equal to that of the transistor M12, the current Is also flows through the transistor M12, and the ratio of the output current Is' to the current Is can be arbitrarily set by setting the size of the transistor M13 to be different from that of the transistor M14.

Therefore, the magnitude of the current Is can be set as an optimal value by properly setting the voltage value of the source enable signal and the size of the transistor M11.

Next, the operation of the charge amplifying circuit 1 shown in FIGS. 2 and 3 will be described using the timing chart shown in FIG. 10.

Since the column line driving signal is a positive voltage between times t1 to t4, the source/sink signal is input, for example, as a signal having an 'L' level indicating the sink.

When the reset signal is input at the time t1, the input and output terminals of the respective inverters become short-circuited in the comparator 11, and the input and output terminals of the comparator 11 including the node Nsen have the threshold voltage (the logical threshold voltage of the inverter).

Similarly, when the reset signal is input, the switch SW3 is turned on, so that the voltage of the storage capacitor Csmp is set to a reference potential.

When the column line driving signal having a positive voltage is supplied at the time t2, the potential of the node Nsen starts to rise to a voltage Va, corresponding to the capacitance Csen of the capacitor and to the voltage level of the column driving signal.

In this case, the voltage Va is determined by the ratio between the capacitance of the capacitor positioned at the intersection supplied with the pulse of the column line driving signal of FIG. 2 and the sum of a capacitance Cst1 of all capacitors to which no column line driving signal is supplied and a parasitic capacitance Cst2.

Next, at the time t3, the sink enable signal and the comparison enable signal are input (these signals simultaneously rise to the H level), which allows the constant current source 12 for a sink to be activated and thus to start the operation thereof.

Figure 10:
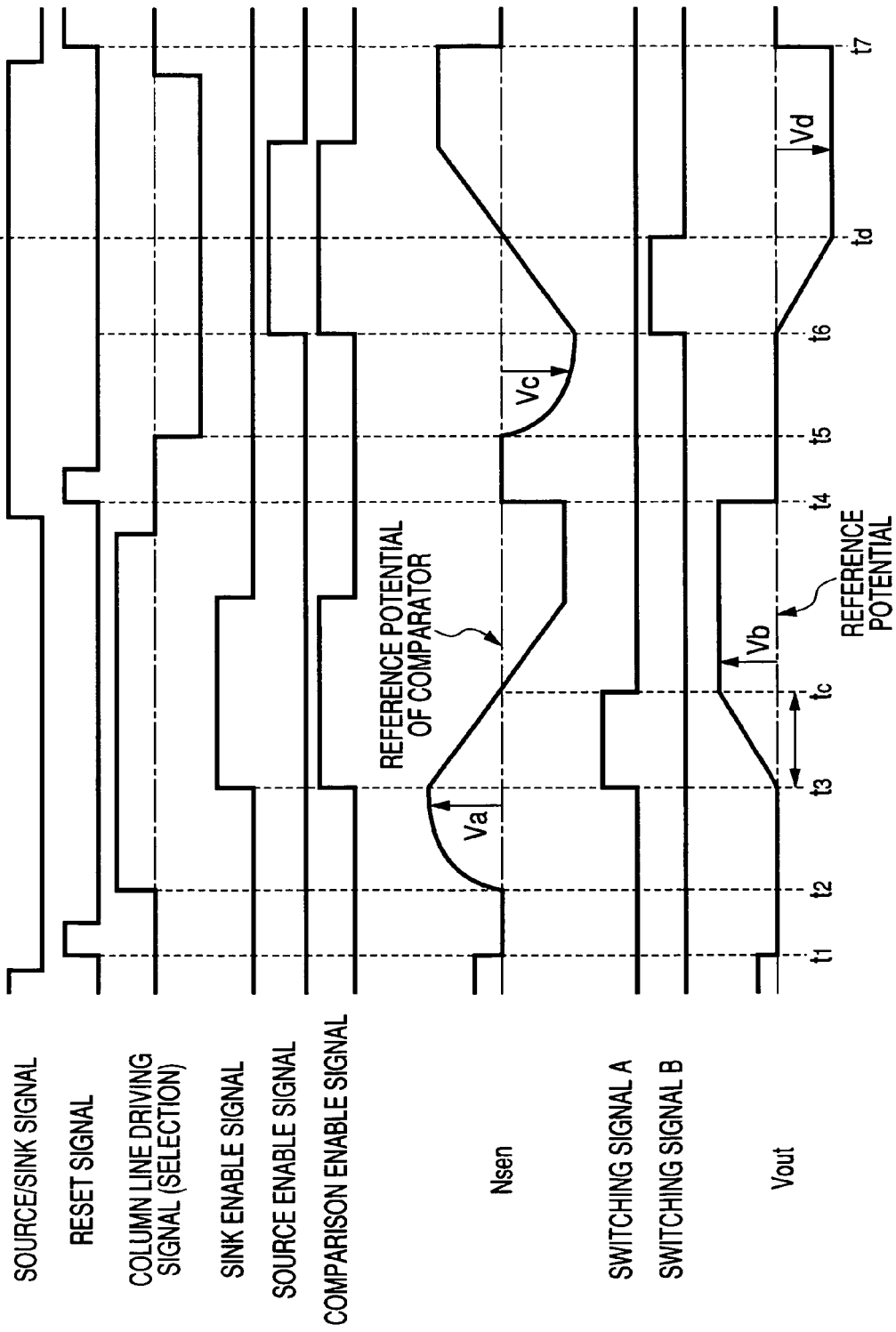
FIG. 10 is a timing chart illustrating the operation of the charge amplifying circuit of FIG. 3.

In this case, as shown in FIG. 10, the potential of the node Nsen starts to fall when charges are discharged from the constant current source 12 for a sink, and the comparator 11 simultaneously outputs the switching signal A having the 'H' level in response to the comparison enable signal.

When the switching signal A is output, the switch SW1 is turned on. Then, a current flows from the constant current source 12 for a sink to the storage capacitor Csmp, so that charges are stored therein. As a result, the potential of the storage capacitor Csmp is higher than the reference potential.

In addition, while the charges are discharged from the node Nsen, at a time tc when the potential crosses the threshold value (the reference potential of the comparator) of the comparator, the output of the comparator 11 is inverted so that the output of the switching signal A is suspended (that is, the variation from the 'H' level to the 'L' level). Then, the electrical connection between the storage capacitor Csmp and the output of the constant current source 12 for a sink is interrupted, so that the supply of the charges to the storage capacitor Csmp is suspended.

By means of the operational sequence as described above, it is possible to generate the potential in proportion to the potential Va applied to the node Nsen to the storage capacitor Csmp as a voltage signal Vb.

Next, since the column line driving signal has a negative voltage between times t4 and t7, the source/sink signal having, for example, an 'H' level indicating the source is input.

When the reset signal is input at the time t4, the input and output terminals of the respective inverters become short-circuited in the comparator 11, and the input and output terminals of the comparator 11 including the node Nsen have the threshold voltage (the logical threshold voltage of the inverter).

Similarly, when the reset signal is supplied, the switch SW3 is turned on, so that the voltage of the storage capacitor Csmp is set to a reference potential.

When the column line driving signal having a negative voltage is supplied at the time t5, the potential of the node Nsen starts to fall to the voltage Va, corresponding to the capacitance Csen of the capacitor and to the voltage level of the column line driving signal.

In this case, the voltage Va is determined by the ratio between the capacitance of the capacitor at the intersection supplied with the pulse of the column line driving signal of FIG. 2 and the sum of the capacitance Cst1 of all capacitors to which no column line driving signal is supplied and the parasitic capacitance Cst2, similar to the case of the sink state.

Next, at the time t6, the source enable signal and the comparison enable signal are input (these signals simultaneously start to rise to the H level), which allows the constant current source 13 for a source to be activated and thus to start the operation thereof.

In this case, as shown in FIG. 10, the potential of the node Nsen starts to rise when charges are supplied by the constant current source 13 for a source, and the comparator 11 simultaneously outputs the switching signal B having the 'H' level in response to the comparison enable signal.

When the switching signal B is output, the switch SW2 is turned on, and a current flows from the constant current source 13 for a source to the storage capacitor Csmp. Then, charges are discharged from the storage capacitor Csmp, so that the potential starts to fall to the potential lower than the reference potential.

In addition, while the charges are supplied to the node Nsen, at a time td when the potential crosses the threshold value of the comparator (the reference potential of the comparator), the output of the comparator 11 is inverted, so that the output of the switching signal B is suspended (that is, the variation from the 'H' level to the 'L' level). Then, the electrical connection between the storage capacitor Csmp and the output of the constant current source 13 for a source 13 is interrupted, so that the discharge of the charges from the storage capacitor Csmp is suspended.

By means of the operational sequence as described above, it is possible to generate the potential in proportion to the potential Va applied to the node Nsen to the storage capacitor Csmp as the voltage signal Vb.

The voltages generated at the storage capacitor Csmp are held, as the voltage signals Vb and Vd, in the sample hold circuit 6 before the next reset signal is supplied, and are then transferred to the A/D converter 8 via the multiplexer 7.

In addition, the ratio between the voltages Va and Vb can be changed by adjusting the ratio of the size of the transistor M3 to that of the transistor M4 of the constant current source 12 for a sink shown in FIG. 8.

Similarly, the ratio between the voltages Vc and Vd can be changed by adjusting the ratio of the size of the transistor M13 to that of the transistor M13 of the constant current source 13 for a source shown in FIG. 9.

In addition, the transmission of the voltage signal from the storage capacitor Csmp to the sample hold circuit 6 may be carried out by performing division on the capacitance ratio at the connection between the capacitance held in the sample hold circuit 6 and the storage capacitor Csmp by means of the switching therebetween, without amplifying the current. The number and size of transistors can be remarkably reduced, as compared to the case in which operational amplifiers are used, and the capacitance formed within an integrated circuit (IC) can be significantly reduced.

Furthermore, FIGS. 8 and 9 show the simplest configuration of the constant current circuit for a sink and the constant current circuit for a source. However, a cascade current mirror circuit having a good constant current characteristic may be employed.

In addition, the transistor M4 of FIG. 8 may be configured to have a plurality of transistors, M4a, M4b, . . . , which have different sizes.

Further, it is possible to raise the divided transistor size (W/L) to the n-th power of 2, to add the respective selection switch SW4a and SW4b to the current output node, and to control the on/off states thereof using control signals SELn (where n is an integer equal to or greater than 1) to change the magnitude of the constant current to be output in a linear and stepwise manner.

This operation means that the magnitude of a voltage Va/Vb can be changed according to usage conditions thereof, with the minimum number of circuits added. Therefore, a fingerprint sensor can be configured to cope with various environments and manufacturing errors.

Figure 11:
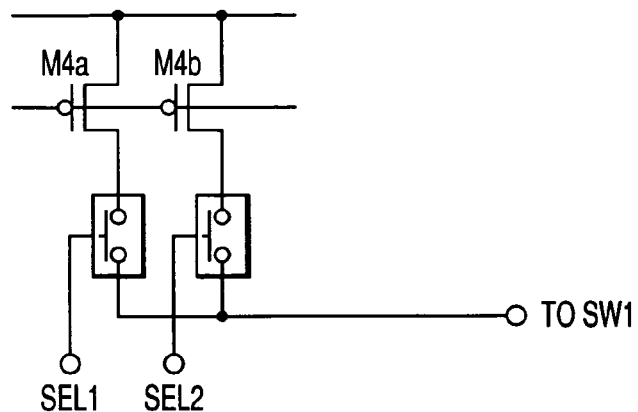
FIG. 11 is a conceptional view explaining a modification of the constant current source 12 for a sink of FIG. 8.

In FIG. 11, the transistor M4 is divided into the plurality of transistors. Also, the transistor M2 may be similarly divided into a plurality of transistors. In this case, the same effect is also obtained.

Furthermore, the same configuration may be applied to the transistors M12 and M14 of the constant current source 13 for a source 13 shown in FIG. 9.

As described above, according to the capacitance detecting circuit (charge amplifying circuit) of the invention, without storing charges using the feedback capacitors as in the related art, the constant current source is used to perform charging discharging on the storage capacitor for output, based on the comparison result from the comparator, and the voltage corresponding to the stored charges is output as a voltage signal, so that the variation in capacitance is converted into the voltage.

In this case, the capacitance detecting circuit of the invention includes a comparator having NOT circuits, which are digital circuits, a constant current source, and capacitors charged and discharged by the constant current source, in order to convert the detected amount of charges into a voltage, and the comparator has more simple structure than the operational amplifier.

Therefore, according to the capacitance detecting circuit of the invention, as compared to the configuration of the related art using the operational amplifier and the feedback capacitor, the comparator is used for input voltage comparison, so that the operational amplifier composed of a plurality of transistors is not needed. In addition, the capacitor performs voltage conversion by means of the charging or discharging of the constant current source, so that it is possible to use a capacitor having small capacitance by adjusting the current to be charged and discharged, which makes it to reduce the area for forming the capacitor. Thus, it is possible to reduce the overall area of the circuit and manufacturing costs thereof.

Further, since it is determined whether the voltage level of the input voltage exceeds the threshold value using the comparator, it is possible to prevent the gain from greatly varying due to the amount of charges to be input, unlike the related art.

What is claimed is:

1. A capacitance detecting circuit that detects the variations of capacitances at intersections of a plurality of column lines and a plurality of row lines opposite to the column lines and that converts the variations of capacitances into electrical signals, comprising:

a column line driving means that drives the column lines;

a comparator that is connected to the row lines to convert charges stored in capacitors formed at the intersections of the driven column lines and the row lines into a measured voltage, and that compares the measured voltage with a predetermined set value to output charging or discharging signals;

a constant current source that performs charging or discharging of charges in response to the charging or discharging signals; and a capacitor that stores charges by means of charging or discharging current, wherein a voltage between both ends of the capacitor is output as the electrical signal, wherein the comparator outputs, as the charging or discharging signal, a charging signal indicating the charging when the measured voltage is larger than the predetermined set value, and outputs a discharging signal indicating the discharging when the measured voltage is smaller than the predetermined set value, wherein the constant current source includes a constant current source for charging and a constant current source for discharging, and
wherein the constant current source performs a charging operation on the capacitor when the charging signal is input and performs a discharging operation on the capacitor when the discharging signal is input.

2. The capacitance detecting circuit according to claim 1, wherein the comparator is composed of an inverter, which is a digital circuit.

3. The capacitance detecting circuit according to claim 1, wherein the constant current source is composed of a current mirror circuit using transistors, and an output transistor of the current mirror circuit is divided into a plurality of transistors whose on or off states are controlled by switches, and
a current ratio is set to a plurality of values.

4. A fingerprint sensor that detects the unevenness of a fingerprint by the variations of capacitances at intersections of a plurality of column lines and a plurality of row lines opposite to the column lines, the variation of capacitances being detected by the capacitance detecting circuit according to claim 1.

5. A fingerprint sensor that detects the unevenness of a fingerprint by the variations of capacitances at intersections of a plurality of column lines and a plurality of row lines opposite to the column lines, the variation of capacitances being detected by the capacitance detecting circuit according to claim 2.

6. A fingerprint sensor that detects the unevenness of a fingerprint by the variations of capacitances at intersections of a plurality of column lines and a plurality of row lines opposite to the column lines, the variation of capacitances being detected by the capacitance detecting circuit according to claim 3.

7. A method of detecting variations of capacitance at intersections of a plurality of column lines and a plurality of row lines opposite to the column lines in a capacitance detecting circuit, the capacitance detecting circuit including a first constant current source for charging and a second constant current source for discharging, said method comprising:
driving the column lines;
converting a charge stored in a capacitor formed at an intersection of one of the driven column lines and one of the row line into a measured voltage;
comparing the measured voltage with a predetermined set value and outputting charging or discharging signals, said outputting including:
outputting a charging signal indicating charging if the measured voltage exceeds the predetermined set value; and
outputting a discharging signal indicating discharging if the measured voltage is smaller than the predetermined set value;
performing, by a constant current source, charging or discharging of charges in response to the charging or discharging signals, said performing including:
performing by the first constant current source a charging operation on a storage capacitor if the charging signal is input; and
performing by the second constant current source a discharging operation on the storage capacitor if the discharging signal is input;
storing charges in the storage capacitor by means of charging or discharging current; and
outputting a voltage between both ends of the storage capacitor as an electrical signal.

* * * * *